United States Patent [19]

Anders et al.

[11] Patent Number: 4,633,215
[45] Date of Patent: Dec. 30, 1986

[54] DISABLED MOTOR VEHICLE HELP SUMMONING DEVICE

[75] Inventors: Harry N. Anders, Vandalia; William E. Ballard, Lewisburg, both of Ohio

[73] Assignee: Stoneburg Manufacturing, Inc., Lewisburg, Ohio

[21] Appl. No.: 725,854

[22] Filed: Apr. 22, 1985

[51] Int. Cl.$^4$ ............................................. B60Q 1/00
[52] U.S. Cl. ...................................... 340/84; 340/90; 40/610; 116/28 R; 116/173
[58] Field of Search ................. 340/81 R, 84, 87, 90, 340/107; 116/28 R, 63 P, 173; 40/556, 571, 573, 574, 610

[56] References Cited

U.S. PATENT DOCUMENTS

| | | | |
|---|---|---|---|
| 1,013,582 | 1/1912 | Bedini | 116/2 |
| 2,160,426 | 5/1939 | Archer | 116/2 |
| 2,875,324 | 2/1959 | Camp et al. | 362/398 |
| 2,887,983 | 5/1959 | Budd | 116/63 |
| 3,241,516 | 3/1966 | Hopkins | 116/173 |
| 3,421,473 | 1/1969 | Weichenrieder | 116/63 |
| 3,476,929 | 11/1969 | Klinger | 362/307 |
| 3,675,616 | 7/1972 | McInnis | 116/173 |
| 3,895,348 | 7/1975 | Palermo | 340/87 |
| 3,933,117 | 1/1976 | Maietta | 116/28 R |
| 4,028,827 | 6/1977 | Hufton | 116/173 X |
| 4,041,452 | 8/1977 | Moya | 340/84 X |
| 4,144,833 | 3/1979 | Newman, Sr. | 116/173 X |
| 4,201,975 | 5/1980 | Marcus | 340/87 X |
| 4,471,873 | 9/1984 | Thomas | 116/173 X |
| 4,489,306 | 12/1984 | Scolari | 340/87 X |

Primary Examiner—James L. Rowland
Assistant Examiner—Jeffery A. Hofsass
Attorney, Agent, or Firm—Biebel, French & Nauman

[57] ABSTRACT

A help summoning device for a disabled motor vehicle includes a base housing securable to the vehicle and defining a battery compartment and a first pin socket mast mounting member electrically connected to the battery. A telescopically extendable mast having two sections axially collapsible to substantially the length of one section but remaining elongated once extended is hollow and includes a second pin socket in its base which can be coupled to the first pin socket to assemble the device. A bulb socket is secured in the upper end of the mast with electrical wires extending through the mast and being of sufficient length to extend between and interconnect the bulb socket and the second pin socket. A brightly colored rigid flag is secured to the upper mast section with a portion of the flag relieved around the bulb socket which receives a flasher bulb and a lens surrounding the bulb and engaging the upper end of the mast in the relieved portion of the flag. The device is secured to a vehicle either magnetically or through a Velcro fastener.

5 Claims, 11 Drawing Figures

FIG-2
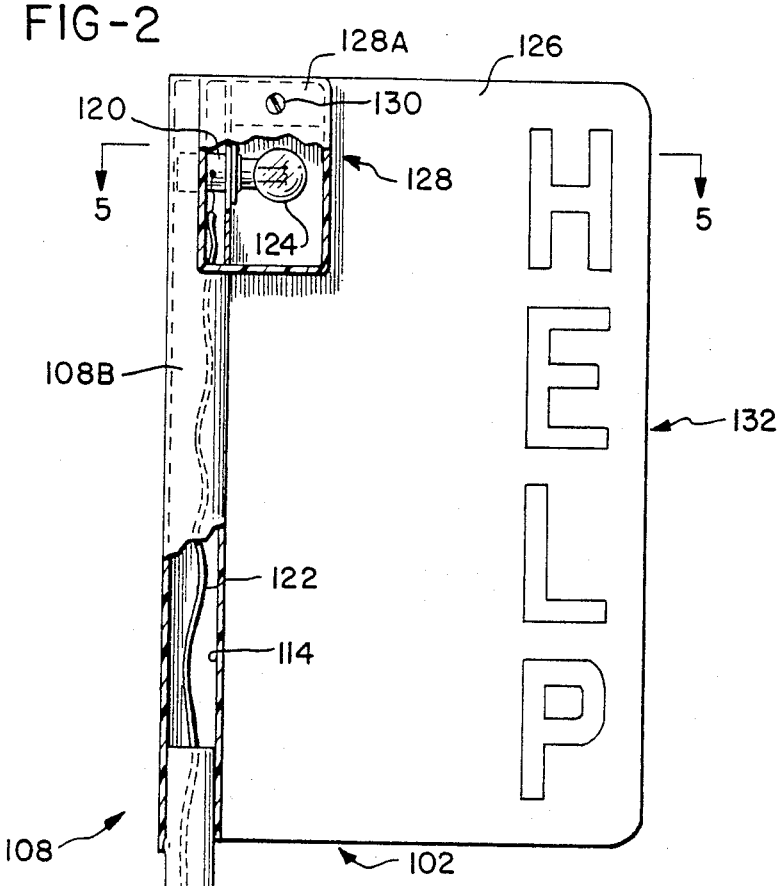
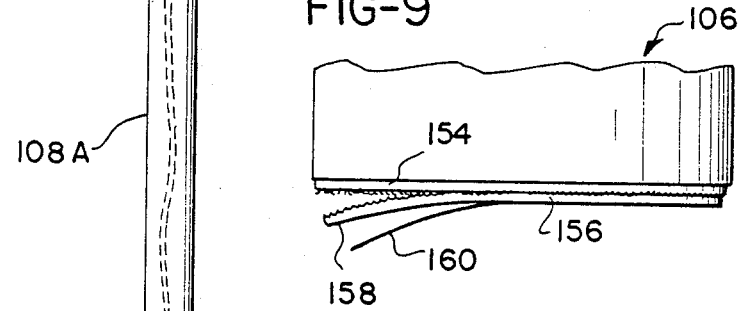
FIG-9
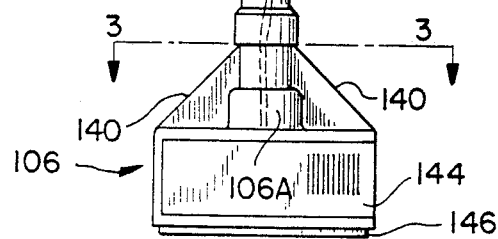

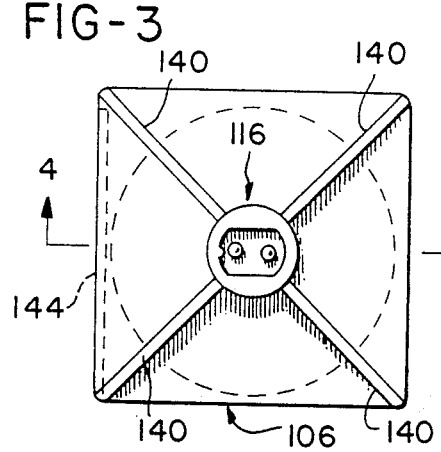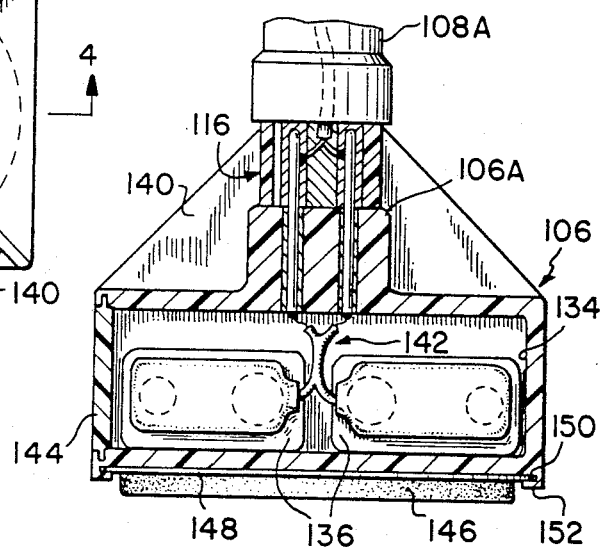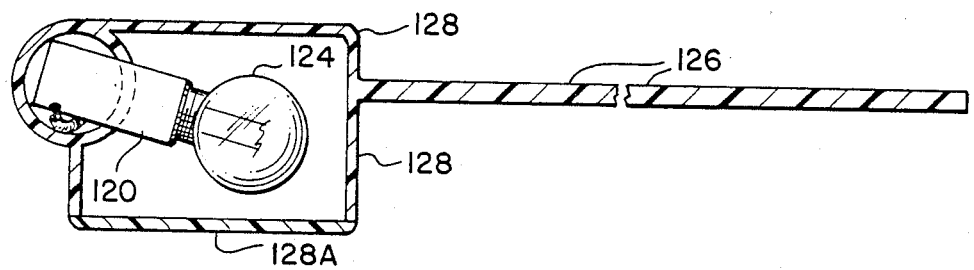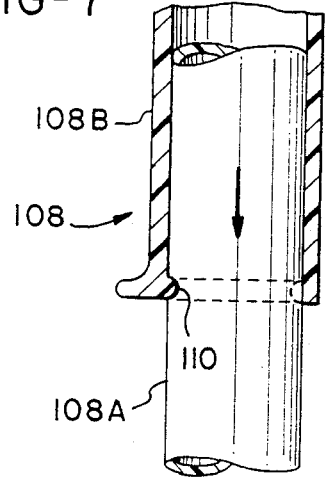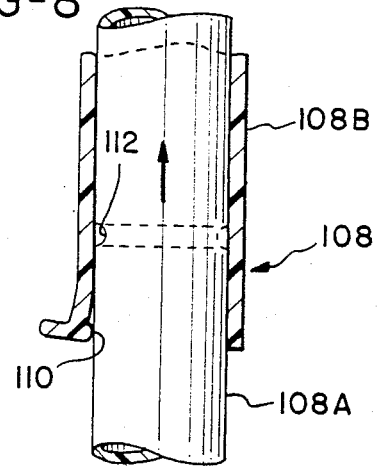

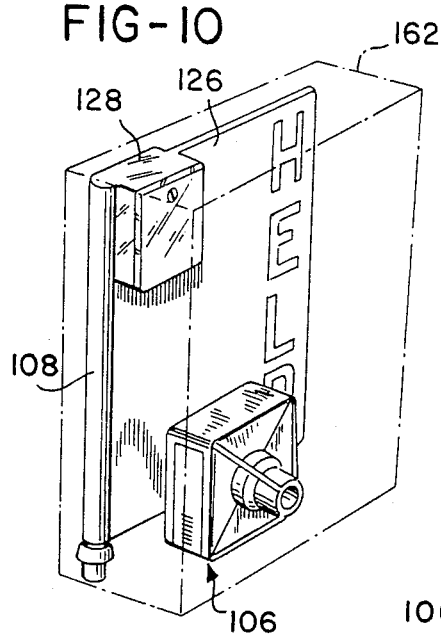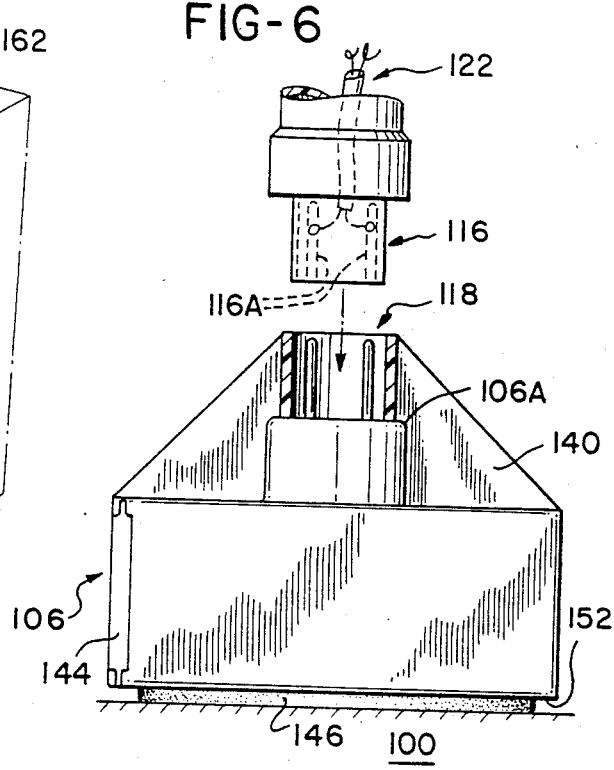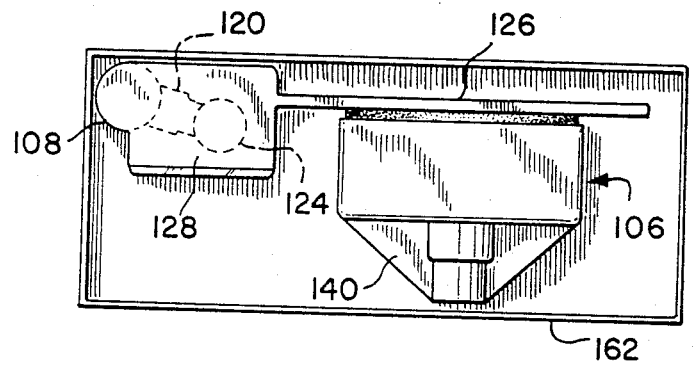

DISABLED MOTOR VEHICLE HELP SUMMONING DEVICE

BACKGROUND OF THE INVENTION

The present invention relates generally to distress signalling or help summoning devices for use on a disabled motor vehicle and, more particularly, to a help summoning device which can be compactly stored within the vehicle for quick assembly and deployment by an occupant of the vehicle from the security of the occupants' compartment. In this way, the occupant of a vehicle, typically a passenger automobile, may remain safely within the occupants' compartment while deploying the help summoning device. In addition to passenger automobiles, the help summoning device of the present invention is contemplated for use on trucks, boats and any other form of vehicle which may become disabled such that there may be a need for summoning help.

On modern highways, and particularly, along the extensive network of freeways extending across the United States, a disabled vehicle presents a serious hazard, both to the occupants of the vehicle and also to the occupants of other vehicles which must pass the disabled vehicle as well as negotiate poor traffic conditions which may be generated thereby. While most modern vehicles include emergency flasher systems which simultaneously flash all turn signals of the vehicle, such emergency flashers are utilized to warn of a wide variety of hazards ranging from traffic congestion to a vehicle parked, for example, to permit a motorist to review a map.

Accordingly, it is desirable to have a specialized help summoning device in the event a vehicle becomes disabled. It is also desirable to be able to deploy such a help summoning device from within the occupants' compartment without having to step outside the vehicle or open an otherwise locked vehicle door. The added safety of such deployment is clear when one considers the dangers presented by high speed traffic passing at close range to a disabled vehicle and also an undesirable element which appears to have increased in numbers in recent years and may be all too apt to take advantage of the situation of a disabled vehicle.

SUMMARY OF THE INVENTION

It is a primary object of the present invention to provide a compactly stored help summoning device for a disabled motor vehicle which device can be quickly assembled and deployed by an occupant of the motor vehicle from the safety of the occupants' compartment by extending the device through an opened window and securing it to the roof of the vehicle preferably on the side of the vehicle facing traffic.

In accordance with the present invention, a help summoning device for use on a disabled motor vehicle comprises a base housing including means for securing the housing to the vehicle, a compartment for receiving at least one battery, and a first pin socket mast mounting member with the pin socket including electrical connections to the battery. A telescopically extendable mast includes at least two sections axially collapsible to substantially the length of one section, but remaining elongated once extended. The mast is hollow and includes a second pin socket at its base which can be coupled to the first pin socket in the base housing. A bulb socket is secured to the upper end of the mast with electrical wires extending through the mast and being of sufficient length to extend between and interconnect the bulb socket and the second pin socket when the mast is fully extended. A brightly colored rigid flag is secured to the upper mast section with a portion of the flag being relieved around the bulb socket into which a flasher bulb is connected. Finally, a lens surrounds the bulb and engages the upper end of the mast and the relieved portion of the flag.

In accordance with this unique construction of a help summoning device, the flag and mast portion of the device can be collapsed to substantially the length of the upper mast section and removed from the base housing which is then positioned onto the rigid flag for storage in a pouch or, preferably, a generally rectangular box within the glove compartment or under the seat of the vehicle. Upon encountering a vehicle disabling difficulty on the highway, the device is removed from the box, the mast is extended and coupled into the base housing via the first and second pin sockets and the base is then secured to the roof of the vehicle by extending the device through an open window of the vehicle. Help is summoned by means of the flag supported atop the extended mast projecting from the base housing and the flashing light atop the flag which commences operation upon coupling the mast to the base housing.

The rigid flag is preferably constructed of a fluorescent material and further comprises at least one help summoning word, such as simply the word "HELP," formed onto the rigid flag in light reflecting letters. An amber lens color is preferred. For the majority of motor vehicles having a steel top, the means for securing the base housing to the vehicle comprises a magnetic mounting pad secured within the bottom of the base housing. Alternately, the base housing may be secured to the vehicle by means of a first patch of tiny hooks secured to the bottom of the base housing and a matching second patch having a complimentary surface of an adhesive pile such that the first and second patches can be pressed together for fastening or pulled apart for unfastening. The second patch preferably has contact cement on the side opposite to the pile with the contact cement being initially covered and protected by release paper which may be peeled away to secure the second patch to the vehicle whereby the help summoning device of the present invention may be used on nonmagnetic surfaces, such as the cabin of a fiberglass boat or the like.

Other objects and advantages of the invention will be apparent from the following description, the accompanying drawings and the appended claims.

BRIEF DESCRIPTION OF THE DRAWINGS

FIG. 2 shows the fully assembled help summoning device of FIG. 1 on an expanded scale and in partial section.

FIG. 3 is a sectional view taken along the section line 3—3 in FIG. 2 to illustrate a plan view of the base housing of the help summoning device.

FIG. 4 is a sectional view through the base housing of FIG. 3 taken along the section line 4—4.

FIG. 5 is a sectional view taken along the section line 5—5 of FIG. 2.

FIG. 6 shows the pin sockets immediately prior to being intermated to assemble the help summoning device.

FIGS. 7 and 8 illustrate one means for maintaining the mast of the help summoning device in its elongated-/expanded state.

FIG. 9. shows an alternate arrangement for securing the device to a vehicle.

FIGS. 10 and 11 show the help summoning device of FIG. 1 as it may be compactly stored within a motor vehicle.

DETAILED DESCRIPTION OF THE INVENTION

Figure 1:
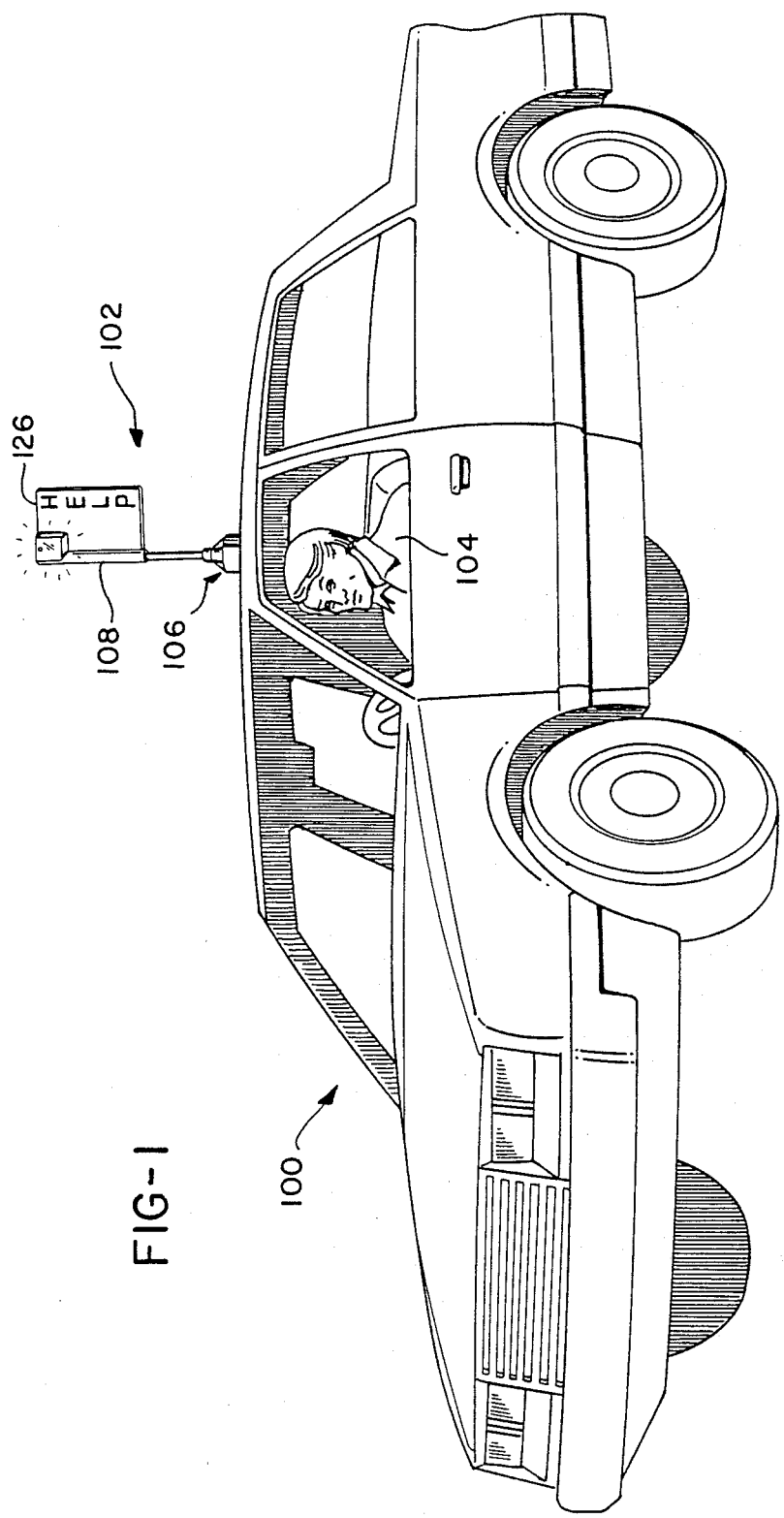
FIG. 1 is a perspective view of a passenger automobile with the help summoning device of the present invention deployed.

Referring now to the drawings, FIG. 1 shows a disabled passenger automobile 100 presumably parked on the right-hand berm of a highway. The help summoning device 102 of the present invention has been deployed by the operator 104 of the automobile from within the occupants' compartment. When the vehicle 100 was disabled, the device 102 was initially assembled and deployed by lowering the driver's window and extending the help summoning device 102 through the window where the device 102 was secured to the top of the automobile 100.

If the automobile 100 had been parked on the left-hand berm of a superhighway or one way street, the help summoning device 102 would have preferably been extended from a passenger window and secured to the roof of the automobile 100 on the passenger side of the car since the help summoning device is preferably deployed on the side of the automobile facing traffic. By permitting the operator or occupant of the vehicle to deploy the help summoning device 102 in this manner, that person may remain safely within the occupants' compartment without having to expose himself to the dangers of traffic or open an otherwise locked vehicle door.

The help summoning device 102 in accordance with the present invention is shown in expanded scale and partially sectioned in FIG. 2. The help summoning device comprises a base housing 106, more fully shown in FIGS. 3, 4 and 6, and a telescopically extendable elongated mast 108, including a lower mast section 108A and an upper mast section 108B. The lower mast section 108A is axially collapsible into the upper mast section 108B such that the mast 108, when collapsed, is substantially the length of the upper mast section 108B. Nevertheless, once extended, the mast 108 remains elongated and must be forcibly collapsed.

In the illustrated embodiment, the mast 108 comprises two sections. Of course, three or any reasonable number of axially collapsible sections may be used to form the mast. The mast 108 is maintained in its elongated state once extended preferably by means of frictional engagement between the lower mast section 108A and the upper mast section 108B. Of course, alternate means such as a tab 110 and receiving indentation 112 as shown in FIGS. 7 and 8 may be provided to maintain the mast 108 in its elongated state. The notch 112 could be expanded entirely around the lower mast section 108A, if desired, to permit the upper mast section 108B to rotate around the lower mast section 108A. Screw threads and other means will also be apparent to those skilled in the art.

The mast 108 is hollow to define a passageway 114 as best shown in FIG. 2. The mast 108 is removably secured to the base housing 106 by means of first and second intermating pin sockets within the base housing 106 and the mast 108, respectively. The second pin socket 116 is a male pin socket mounted within and forming the lower end of the lower mast section 108A. The first pin socket 118 is a female pin socket mounted within an upper extenson 106A of the base housing 106. The second pin socket 116 is inserted into the first pin socket 118 to secure the mast 108 to the base housing 106 and assemble the help summoning device 102.

A light bulb socket 120 is secured to the upper end of the upper mast section 108B. Electrical wires 122 extend between the bulb socket 120 and the electrical connections 116A of the second pin socket 116. The electrical wires 122 are positioned in the passageway 114 through the hollow mast 108 and are of a sufficient length to interconnect the second pin socket 116 within the base of the lower mast section 108A to the bulb socket 120 when the mast 108 is fully extended as shown in FIG. 2. A flasher bulb 124 is connected into the bulb socket 120. A variety of flasher bulbs are commercially available with a suitable bulb being sold by General Electric as a GE455.

A brightly colored rigid flag 126 is secured to the upper mast section 108B with a portion of the flag 126 being relieved around the bulb 124 and the bulb socket 120. A lens 128 is fitted around the bulb 124 and bulb socket 120 and engages the upper end of the mast 108 and the relieved portion of the flag 126 with a portion 128A of the lens 128 being removably secured to the assembly by means of a screw 130 or otherwise to permit replacement of the bulb 124.

The flag 126 is preferably constructed of a fluorescent material and further comprises at least one help summoning word spelled in light reflecting letters formed onto the rigid flag 126. For example, the word "HELP" may be utilized as shown at 132. Applicants have discovered that the help summoning word is preferably formed in black letters on the fluorescent flag 126 to enhance visibility both during daylight and dark hours. The lens 128 is preferably amber in color.

The base housing 106 will now be described with reference to FIGS. 3, 4 and 6. The base housing 106 comprises a compartment 134 for receiving at least one battery and, in the illustrated embodiment, receives two 9 volt batteries 136. The first pin socket 118 is supported within an upper extension 106A of the base housing 106. Ribs 140 serve to rigidify and reinforce the extension 106A to provide support for the mast 108 when it is inserted into the extension 106A to assemble the help summoning device 102.

The batteries 136 are connected in parallel to the first pin socket 118 by means of electrical conductors 142. The battery compartment 134 is accessed through a sliding door 144 which removably engages one side of the base housing 106 for replacement of the batteries 136. It is noted that popular alkaline batteries are recommended for use in the help summoning device 102 because alkaline batteries have an extended shelf life. Accordingly, the batteries 136, if alkaline, will probably only need to be replaced after use of the device.

The base housing 106 and, hence, the help summoning device 102 of the present invention is secured to a motor vehicle 100 by securing means positioned within the bottom of the base housing 106. For the majority of applications where the roof of the vehicle or other surface to receive the help summoning device 102 is ferromagnetic metal, the securing means comprise a magnetic mounting pad 146 including a steel backing plate 148 which snaps into a channel 150 formed around the bottom of the base 106.

While the magnetic mounting pad 146 may be secured into the bottom of the base housing 106 in any of a number of way including the snap fit illustrated, glue, rivets, screws or any other means as will be apparent to those skilled in the art, the outer surface of the magnetic pad 146 should extend beyond the lower end surface 152 of the base housing 106 such that the magnetic pad 146 may come into secure contact with a substantially flat surface of a motor vehicle, preferably the roof as illustrated in FIG. 1.

The means for securing the base housing 106 to the vehicle may alternately comprise a first patch 154 of tiny hooks secured to the bottom of the base housing 106 with a matching second patch 156 having a complementary surface of an adhesive pile such that the first and second patches can be pressed together for fastening or pulled apart for unfastening, see FIG. 9. The second patch preferably includes contact cement 158 on the side opposite to the pile with the contact cement 158 being initially protected and covered by release paper 160 which may be peeled away such that the second patch 156 may be secured to a vehicle. In this way, the help summoning device 102 of the present invention may be used on nonmagnetic surfaces, such as the cabin of a fiberglass boat or the like. Such material is now well known as a fastener for clothing and the like and is sold under the trademark Velcro.

Finally, in FIGS. 10 and 11, the help summoning device 102 is shown collapsed with the mast 108 removed from the base housing 106 which is then placed on the flag 126 for storage within a pouch or a plastic box 162, as shown. One operable embodiment of the present invention which expands to an approximately 15¼ inch mast dimension with a 5⅛ inch by 8 inch help summoning flag can be collapsed into a 2¼ by 5½ by 8½ inch box or plastic container 162 as shown in FIGS. 10 and 11.

It will be apparent from the above description that an improved help summoning device for use on a disabled motor vehicle has been described. The help summoning device of the present invention may be compactly stored within a vehicle yet quickly removed from storage with the collapsible mast expanded and inserted into the base housing to activate the flashing bulb within the upper portion of the help summoning flag with the entire unit then being deployed from the safety and security of the occupants' compartment by passing the unit through a lowered window of the disabled motor vehicle and securing the base housing to the roof of the vehicle, preferably on the side facing traffic.

While the help summoning device herein described constitutes a preferred embodiment of this invention, it is to be understood that the invention is not limited to this precise embodiment and that changes may be made therein without departing from the scope of the invention which is defined in the appended claims.

What is claimed is:

1. A help summoning device for use on a disabled motor vehicle comprising:

a base housing including means for securing said housing to said vehicle, a compartment for receiving at least one battery, and a first pin socket mast mounting member, said first pin socket including electrical connections to said battery;

a telescopically extendable elongated mast including at least two sections axially collapsible to substantially the length of one section but remaining elongated once extended, said mast being hollow and including a second pin socket at the base of the lowermost mast section which can be coupled to said first pin socket of said base housing and a bulb socket secured to the upper end of the uppermost mast section and extending outwardly therefrom with electrical wires extending through said hollow mast and interconnecting said second pin socket in the base of said mast to said bulb socket;

a flasher bulb connected into said bulb socket;

a brightly colored rigid flag secured to the uppermost mast section with a portion of the flag being relieved around said bulb and bulb socket; and a lens fitted around said bulb and bulb socket and engaging the upper end of said mast and the relieved portion of said flag whereby said flag and mast portion of said device can be collapsed to substantially the length of said uppermost mast section with said base housing being positioned onto said rigid flag for storage in a generally rectangular box which can be fitted within the glove compartment or under the seat of said vehicle, said mast being extended and coupled to said base housing via said first and second pin sockets and said base being secured to the roof of said vehicle to summon help by means of said flag and said flasher bulb which commences operation upon coupling said mast to said base housing.

2. A help summoning device as claimed in claim 1 wherein said rigid flag is constructed of a fluorescent material and further comprising at least one help summoning word comprising light reflecting letters formed onto said rigid flag.

3. A help summoning device as claimed in claim 2 wherein said lens is amber in color.

4. A help summoning device as claimed in claim 3 wherein said means for securing said base housing to said vehicle comprises a magnetic mounting pad secured within the bottom of said base housing.

5. A help summoning device as claimed in claim 3 wherein means for securing said base housing to said vehicle comprises a first patch of tiny hooks secured to the bottom of said base housing and a matching second patch having a complementary surface of an adhesive pile such that said first and second patches can be pressed together for fastening or pulled apart for unfastening, said second patch having contact cement on the side opposite to said pile, said contact cement being initially protected by release paper which may be peeled away to secure said second patch to said vehicle whereby said help summoning device may be used on nonmagnetic surfaces such as the cabin of a fiberglass boat or the like.

* * * * *